United States Patent [19]

Mitamura et al.

[11] Patent Number: 5,338,377
[45] Date of Patent: Aug. 16, 1994

[54] BALL-AND-ROLLER BEARING

[75] Inventors: Nobuaki Mitamura; Shigeru Okita, both of Kanagawa, Japan

[73] Assignee: NSK Ltd., Tokyo, Japan

[21] Appl. No.: 946,638

[22] Filed: Sep. 18, 1992

[30] Foreign Application Priority Data

Sep. 19, 1991 [JP] Japan .................................. 3-239386

[51] Int. Cl.$^5$ ...................... F16C 33/62; C22C 38/22; C22C 38/24
[52] U.S. Cl. ..................................... 148/318; 148/906; 384/912
[58] Field of Search ................. 148/318, 906; 384/912

[56] References Cited

U.S. PATENT DOCUMENTS

| | | | |
|---|---|---|---|
| 4,904,094 | 2/1990 | Furumura et al. | 384/492 |
| 4,930,909 | 6/1990 | Murakami et al. | 384/492 |
| 4,971,634 | 11/1990 | Shibata et al. | 148/16.5 |
| 5,137,375 | 8/1992 | Murakami et al. | 384/450 |

FOREIGN PATENT DOCUMENTS 2449987 5/1987 Japan .
2235212 7/1990 United Kingdom .

Primary Examiner—Deborah Yee
Attorney, Agent, or Firm—Sughrue, Mion, Zinn, Macpeak & Seas

[57] ABSTRACT

In order to provide a ball-and-roller bearing that has a longer life and which exhibits higher reliability than the prior art products not only under lubrication in the presence of foreign matter but also under lubrication in clean conditions, according to the present invention, a bearing material that contains 0.2 to 1.0 wt % of carbon and at least 1 wt % in total of one or more elements selected from among chromium, molybdenum and vanadium is subjected to a carbonitriding treatment and a hardening heat treatment to make an alloy steel in which the area ratio of carbonitrides present in the surface layer of said bearing material per unit area is adjusted to be at least 10%, a maximum grain size of carbonitrides present in said surface layer being no more than 3 μm, the content of retained austenite ($\gamma_R$) in said surface layer being 25 to 45 vol %, and said surface layer having a surface hardness of at least 750 Hv. At least one of the races and rolling elements of the bearing is made of this alloy steel.

4 Claims, 6 Drawing Sheets

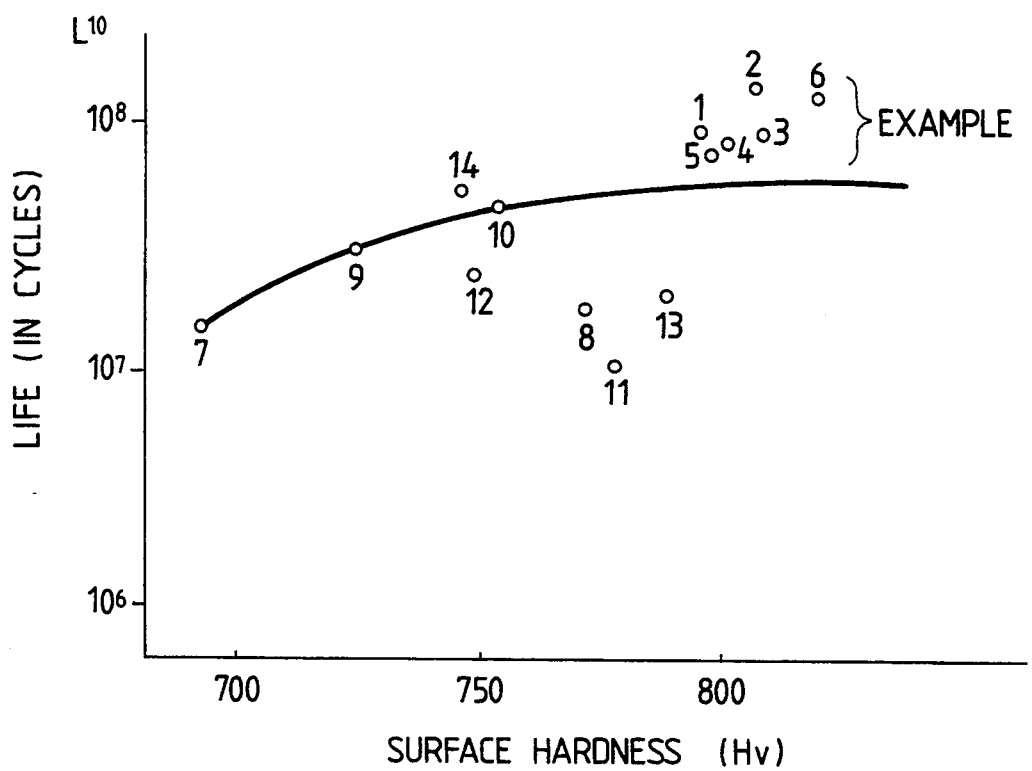

BALL-AND-ROLLER BEARING

BACKGROUND OF THE INVENTION

The present invention relates to a ball-and-roller bearing, more particularly, to an improvement in the life of ball-and-roller bearings that are to be used in transmissions, engines, etc. on automobiles, agricultural machines, construction machines, as well as iron- and steel-making machines.

One of the factors that have heretofore been known to cause a shortened life of ball-and-roller bearings is the entrance of foreign materials into bearing lubricants. It is known that metal cuttings, shavings, burrs, worn particles and other foreign materials are present in lubricants for bearings. When ball-and-roller bearings are used in an environment that involves such foreign materials, the latter will damage their races and/or rolling elements, thereby shortening their service life. The problem with this situation is that in the presence of foreign materials, the service life of ball-and-roller bearings is shortened to one-tenth of the case where they are absent from lubricants.

Further, as in the case of pitting which occurs in the o automotive speed change gear wheels, specks of pits develop on the raceway surfaces or rolling contact surfaces of ball-and-roller bearings due to the fatigue caused by rolling, thereby shortening the life of those bearings. Under the circumstances, Examined Japanese Patent publication No. 24499/1987 and Unexamined Published Japanese Patent Application No. 34766/1990 have proposed that a heat treatment such as carburization be conducted on low- to medium-carbon, low-alloy steels to precipitate spheroidal carbides on their surface, thereby enhancing the hardness of their surface so that they will have better resistance to pitting.

This prior art method which relies upon enhancing the surface hardness of the races and rolling elements of a ball-and-roller bearing is effective in reducing the formation of indentations due to foreign materials. On the other hand, the races and rolling elements will have lower toughness and cracking tends to develop at sites of damage that is caused by the foreign materials present in the lubricant; this has been the start point of early flaking, which therefore limits the extent by which the service life of ball-and-roller bearings can be prolonged.

Ball-and-roller bearings are also subjected to cyclic shear stresses under high areal pressure and, hence, bearing materials are required to have sufficient strength to withstand the applied shear stress. To this end, high-chromium carbon bearing steels have heretofore been used. However, as the conditions under which bearings are used have recently become increasingly hostile, particularly in the case of lubrication in the presence of foreign matter, difficulty is involved in extending the life of bearings by merely increasing their mechanical strength, chiefly hardness.

Under the circumstances, the following was previously proposed in Unexamined Published Japanese Application No. 55423/1989: if the contents of carbon, retained austenite and carbonitrides in the rolling surface layer of a ball-and-roller bearing are specified to appropriate levels, the stress concentration that will develop at edges of indentation due to a foreign material present in the lubricant for the bearing can be reduced and the occurrence of cracking can also be suppressed to extend the life of the bearing.

According to that proposal, the life of the ball-and-roller bearing under lubrication in the presence of a foreign material can be improved by insuring that retained austenire will be present in an appropriate amount. On the other hand, the proposal involves the disadvantage that the retained austenite lowers the surface hardness of the bearing, thereby reducing its fatigue resistance. In other words, the proposal had room for improvement to establish the appropriate relationship between the retained austenite level ($\gamma_R$ in vol %) and the surface hardness (Hv).

In addition, the proposal did not take into account the effects on the bearing's life of the particle size of carbides and carbonitrides; in particular, large-size carbides, if they are subjected to cyclic stress, will be the start point of fatigue, leading to the occurrence of cracking and flaking but this possibility was not at all considered by the proposal.

To solve this problem, an inventor of the present invention previously filed U.S. Pat. No. 5,137,375, establishing an optimal relationship between the content of retained austenite in the rolling surface layer of a ball-and-roller bearing and its surface hardness. Further, the average particle sizes of carbides and carbonitrides present in the rolling surface layer were adjusted to optimal values so as to compensate for the decrease in surface hardness due to the presence of retained austenite, thereby providing a long-lived ball-and-roller bearing.

The related art described in the U.S. Pat. No. 5,137,375 has had the problem that if the carbon content of a bearing material exceeds a certain level, macrocarbides tend to form and that, therefore, carburization at high carbon concentration can result in the formation of macrocarbides on the surface, leading to a shortened life of the bearing.

A further problem with the related art is that if the bearing material is subjected to a carburization treatment only, quenching must be done at elevated temperature in order to yield an appropriate amount of austenire. However, if quenching is performed at elevated temperature, the content of fine carbides will decrease to such an extent that the precipitation hardening effect of the fine carbides cannot be fully attained.

SUMMARY OF THE INVENTION

The present invention has been accomplished under these circumstances and has as an object providing a ball-and-roller bearing that has a longer life and which exhibits higher reliability than the prior art products not only under lubrication in the presence of foreign materials but also under lubrication in clean conditions.

To attain the aforementioned object, the present invention provides a ball-and-roller bearing comprising races and rolling elements which is characterized in that at least one of said races and rolling elements is made of an alloy steel that contains 0.2 to 1.0 wt % of carbon and at least 1 wt % in total of one or more elements selected from among chromium, molybdenum and vanadium, said alloy steel having been subjected to carbonitriding and hardening heat treatment, such that the area ratio of carbonitrides present in the treated surface layer per unit area is at least 10%, a maximum grain size of carbonitrides present in said surface layer being no more than 3 $\mu$m, the content of retained austenite ($\gamma_R$) in said surface layer being 25 to 45 vol %, and said surface layer having a surface hardness of at least 750 Hv.

BRIEF DESCRIPTION OF THE DRAWINGS

FIG. 11 is a graph showing the relationship between the surface hardness (Hv) and the life of bearing ($L_{10}$) under lubrication in clean conditions.

DETAILED DESCRIPTION OF THE PREFERRED EMBODIMENTS

Figure 1:
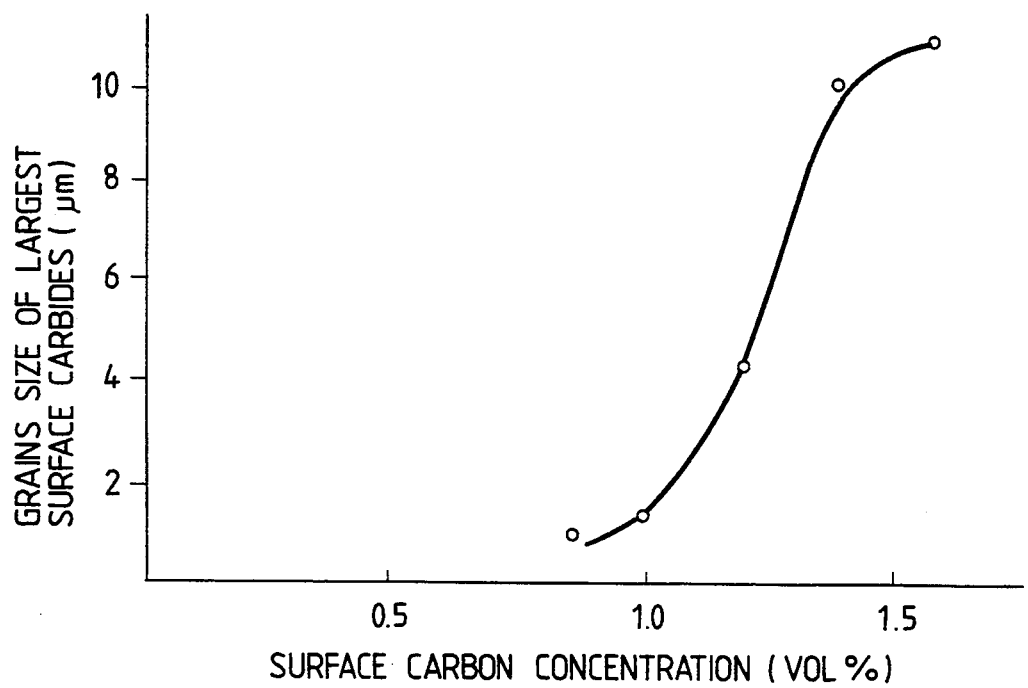
FIG. 1 is a graph showing the relationship between the surface carbon concentration (vol %) and the grain size of largest surface carbides (μm) as obtained when a carburizing treatment was conducted at 930° C. for 5 h.

According to the present invention, a bearing material that contains 0.2 to 1.0 wt % of carbon and at least 1 wt % in total of one or more elements selected from among chromium, molybdenum and vanadium is subjected to a carbonitriding treatment, followed by a hardening heat treatment to make an alloy steel in which the area ratio of carbonitrides present in the treated surface layer per unit area is adjusted to be at least 10%, a maximum grain size of carbonitrides present in said surface layer being no more than 3 μm, the content of retained austenite ($\gamma_R$) in said surface layer being 25 to 45 vol %, and said surface layer having a surface hardness of at least 750 Hv. If at least one of the races and rolling elements of a ball-and-roller bearing is made of this alloy steel, the contents of carbon and nitrogen that must be dissolved in order to insure optimal levels of retained austenire ($\gamma_R$ in vol %) and carbonitrides can be increased without causing the precipitation of macrocarbides.

As a result, the present invention offers a ball-and-roller bearing that has a longer life and which exhibits higher reliability than the prior art products not only water lubrication in the presence of foreign materials but also under lubrication in clean conditions.

On the pages that follow, the mode of action of the alloy steel to be used in the present invention, as well as the criticality of the numerical limitations on that alloy steel are described in detail.

0.2 wt % $\leq$ C $\leq$ 1.0 wt %

It order to attain the hardness (HRC $\geq$ 60) necessary for a particular ball-and-roller bearing, at least 0.6 wt % of carbon must be contained in the surface of that bearing. When hardening the surface of a bearing material by subjecting it to a carbonitriding treatment, not only is the treatment time prolonged to increase the cost but also the efficiency of the heat treatment is lowered if the carbon content of that bearing material is less than 0.2 wt %. In addition, the hardness of the core is insufficient to prevent its plastic deformation and, hence, the life of the bearing is shortened.

On the other hand, if the content of carbon in the bearing material exceeds 1.0 wt %, macrocarbides will be precipitated in the steel making process, thereby shortening the life of the bearing considerably unless a special preliminary heat treatment is performed prior to the intended carbonitriding treatment. As a further problem, carbon and nitrogen will be introduced into the bearing material in only insufficient amounts when carbonitriding is performed in the manner to be described later in this specification. As a result, the proportions of carbon and nitrogen that are dissolved in the matrix are lowered to form a nonuniform solid solution, which becomes a source of stress concentration, thus leading to a shortened life of the ball-and-roller bearing.

For these reasons, the content of carbon in the bearing material to be used in the present invention is limited to lie within the range of 0.2 to 1.0 wt %.

At least 1 wt % in total of one or more elements selected from among chromium, molybdenum and vanadium Chromium, molybdenum and vanadium are each a carbonitride forming element and are added to promote the formation of fine carbonitrides which are to be described hereinafter. These elements need be contained in amounts of at least 1 wt %, taken either individually or in combination.

From an economic viewpoint, chromium which is comparatively inexpensive is advantageously contained in an amount of at least 1 wt %. For the purpose of extending the life of bearings, it is preferred to add chromium in a certain amount as supplemented by the addition of molybdenum and vanadium.

Details of the addition of chromium, molybdenum and vanadium, including optimum contents thereof, are given below.

1.0 wt % $\leq$ Cr $\leq$ 13.0 wt %

Chromium (Cr) improves the quenchability of steels and their resistance to tempering; at the same time, it forms hard and fine carbonitrides to increase the hardness of bearing materials. The effectiveness of chromium is marked if it is contained in an amount of 1.0 wt % and more. However, if the Cr content exceeds 13.0 wt %, not only are the carbonitriding characteristics of the bearing material deteriorated but also other problems occur as exemplified by impaired workability in steps that precede the heat treatments. For these reasons, the chromium content is preferably limited to lie within the range of 1.0 to 13.0 wt %.

0.5 wt % ≦ Mo ≦ 3.0 wt %

Like chromium, molybdenum (Mo) improves the quenchability of steels and their resistance to tempering; at the same time, it forms fine carbonitrides to increase the hardness of bearing materials. The effectiveness of molybdenum is marked if it is contained in an amount of 0.5 wt % and more. However, its effectiveness will not increase even if its content exceeds 3.0 wt %. Hence, the molybdenum content is preferably limited to lie within the range of 0.5 to 3.0 wt %.

0.2 wt % ≦ V ≦ 2.0 wt %

Like chromium and molybdenum, vanadium (V) improves the resistance of steels to tempering; at the same time, it forms fine carbonitrides to increase the hardness of bearing materials. The effectiveness of vanadium is marked if it is contained in an amount of 0.2 wt % and more. However, its effectiveness will not increase even if its content exceeds 2.0 wt %. Hence, the vanadium content is preferably limited to lie within the range of 0.2 to 1.0 wt %.

For the reasons set forth above, the total content of one or more elements selected from among chromium, molybdenum and vanadium is specified to be at least 1 wt %.

Carbonitriding

With a view to extending the life of bearings, the retained austenite level ($\gamma_R$ in vol %) must be limited to lie within the range of 25 to 45 vol % while, at the same time, the drop in surface hardness due to the presence of retained austenite must be compensated. To this end, the bearing material, after it is subjected to carbonitriding treatment, must be quenched by a direct method at an elevated temperature.

However, if the quenching temperature is elevated, more carbon will be dissolved in the matrix whereas less carbon is available for carbides (carbonitrides); hence, the formation of carbides (carbonitrides) is reduced. If carburization is performed at a higher carbon concentration in order to increase the amount of carbon available for carbides (carbonitrides), the generation of macrocarbides becomes a problem.

FIG. 1 is a graph showing the relationship between the surface carbon concentration (vol %) and the grain size of largest carbide particles present in the surface layer as obtained when a carburizing treatment was conducted at 930° C. for 5 h. One can see from FIG. 1 that when the surface carbon concentration was ca. 1.2 vol % or more, especially ca. 1.4 vol % or more, the grain size of largest carbides present in the surface layer increased sharply to cause the precipitation of macrocarbides.

In the carbonitriding treatment, both carbon and nitrogen will be dissolved in the matrix. Therefore, even if the dissolution of carbon in the matrix is curtailed by an amount corresponding to the dissolution of nitrogen in the matrix, the surface harness that can be attained is the same as what is achieved by the carburizing treatment. Thus, the carbon concentration is reduced by a sufficient amount to inhibit the formation of macrocarbides. As a further advantage, the carbonitrides produced by carbonitriding are finer than the carbides produced by carburization and, hence, are effective in extending the service life of bearings.

Figure 2:
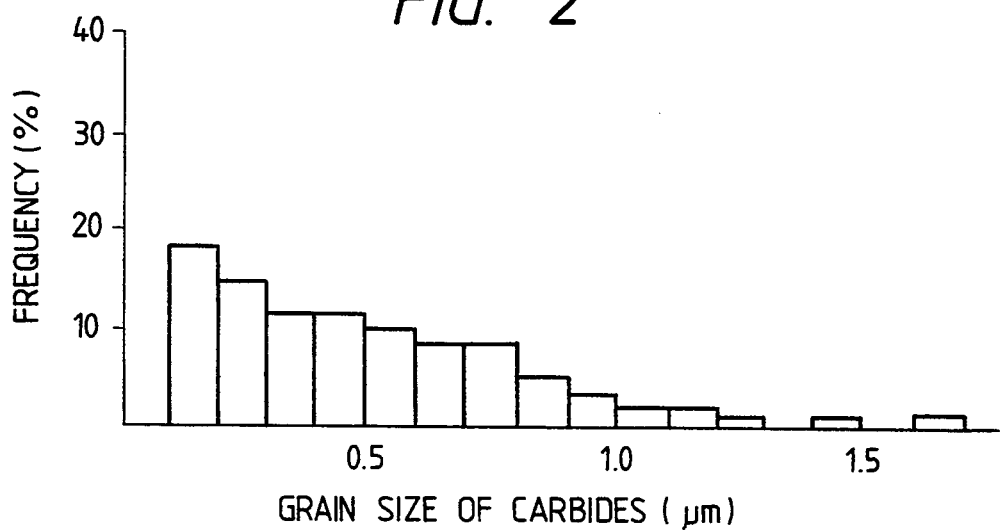
FIG. 2 is a histogram showing the grain size of carbides (μm) and their frequency (%) as obtained when a carburizing treatment was conducted at 930° C. for 5 h.
Figure 3:
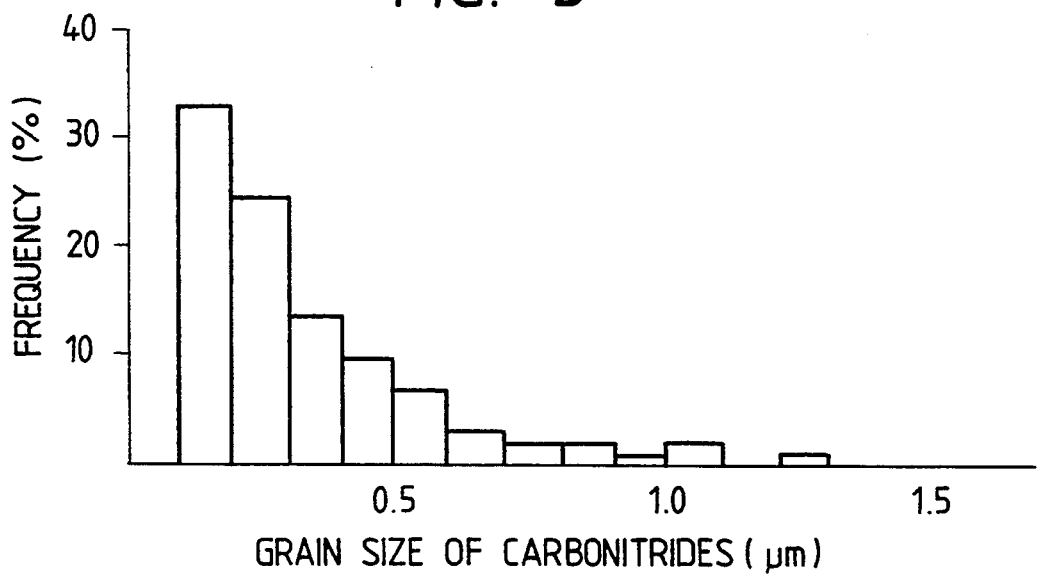
FIG. 3 is a histogram showing the grain size of carbides (μm) and their frequency (%) as obtained when a carbonitriding treatment was conducted.

FIG. 2 is a histogram showing the grain size of carbides (μm) and their frequency (%) as obtained when a carburizing treatment was conducted at 930° C. for 5 h (surface carbon concentration: 1.2%), and FIG. 3 is a histogram showing the grain size of carbonitrides (μm) and their frequency (%) as obtained when a carbonitriding treatment was conducted.

One can see from FIGS. 2 and 3 that the carbonitrides generated by the carbonitriding treatment were finer than the carbides generated by the carburizing treatment. It can also be seen that the frequency of finer particles is higher in the former case than in the latter case, demonstrating the ease of precipitation of fine carbonitrides which are advantageous for the purpose of extending the life of bearings.

For the reasons set forth above, the bearing material is subjected to carbonitriding in the present invention.

Hardening heat treatment

Conventional carbonitriding treatments have chiefly been performed for the purpose of providing improved quenchability or solid-solution hardening with carbon and nitrogen. To this end, one only need insure sufficient amounts of carbon and nitrogen to provide improved quenchability and perform solid-solution hardening with carbon and nitrogen; the common practice has been to perform direct quenching after carbonitriding.

Figure 4:
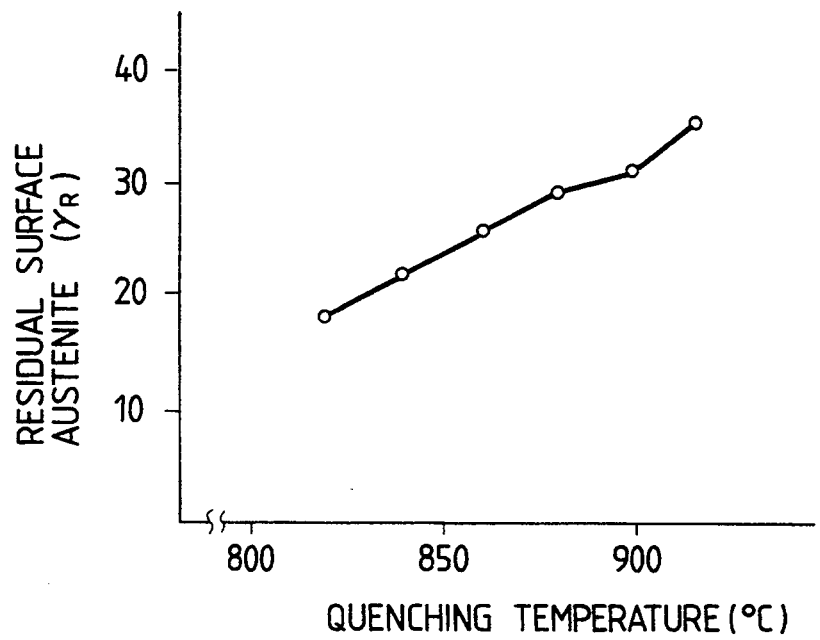
FIG. 4 is a graph showing the relationship between the quenching temperature (°C.) and the surface retained austenite level ($\gamma_R$ in vol %) as obtained when a carburized bearing material was quenched by the conventional direct method.
Figure 5:
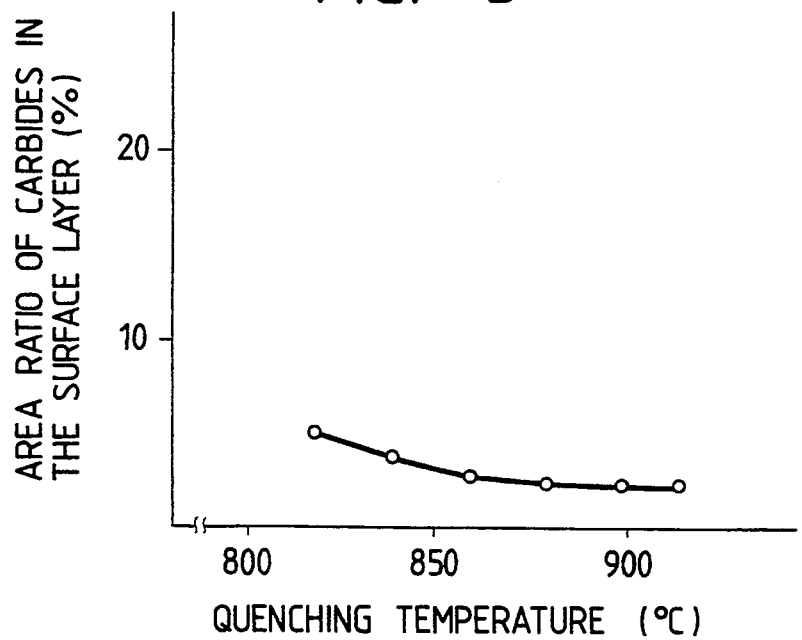
FIG. 5 is a graph showing the relationship between the quenching temperature (°C.) and the area ratio (%) of carbides present in the surface layer per unit area as obtained when a carburized bearing material was quenched by the conventional direct method.

FIG. 4 is a graph showing the relationship between the quenching temperature (°C.) and the retained surface austenite level ($\gamma_R$ in vol %) as obtained when a carburized bearing material was quenched by the conventional direct method; and FIG. 5 is a graph showing the relationship between the quenching temperature (°C.) and the area ratio (%) of carbides present in the surface layer per unit area.

One can see from FIGS. 4 and 5 that if the quenching temperature is increased in the conventional direct method, the retained austenite level ($\gamma_R$ in vol %) increases whereas the area ratio (%) of carbides present in the surface layer per unit area decreases. This is because more of the carbon is dissolved in the matrix but less carbon is available for carbides. The result is the same even if direct quenching is performed after the carbonitriding treatment.

Under the circumstances, the present invention adopts the following hardening heat treatment in order to produce a greater amount of fine carbonitrides than in the conventional carbonitriding treatment.

First, the temperature of a bearing material is lowered from the carbonitriding temperature below the point of $A_1$ transformation (723° C.). When the bearing material passes through point $A_1$, nuclei for carbonitrides are formed. Thereafter, the temperature of the bearing material is elevated above point $A_1$ (quenching temperature) and held at that level until the size of the nuclei becomes smaller than 3 μm, followed by quenching and tempering. In short, the amount of carbonitrides can be increased by austenizing the bearing material at a temperature lower than the temperature for primary carbonitriding treatment. Further, the retained austenite level ($\gamma_R$ in vol %) can be controlled by changing the nitrogen content, so an appropriate retained austenire level ($\gamma_R$ in vol %) can be easily attained even at low austenizing temperatures.

It should be noted that if the time period during which the bearing material is held above point $A_1$ is unduly long, the size of carbonitrides becomes excessive. On the other hand, if the holding time is unduly short, the carbonitrides will grow only insufficiently and erratically to disappear eventually. Hence, depending upon the volume to surface area ratio (V/S) of races and rolling elements of a ball-and-roller bearing, the holding time is preferably selected between the following two cases:

V/S≦8 (small object): holding time=20-30 min
V/S>8 (large object): holding time=40-60 min.

At least 10% in terms of the area ratio of carbonitrides present in the surface layer per unit area Precipitation hardening by carbonitrides is effective in improving the surface hardness for a given retained austenite level ($\gamma_R$ in vol %).

Figure 6:
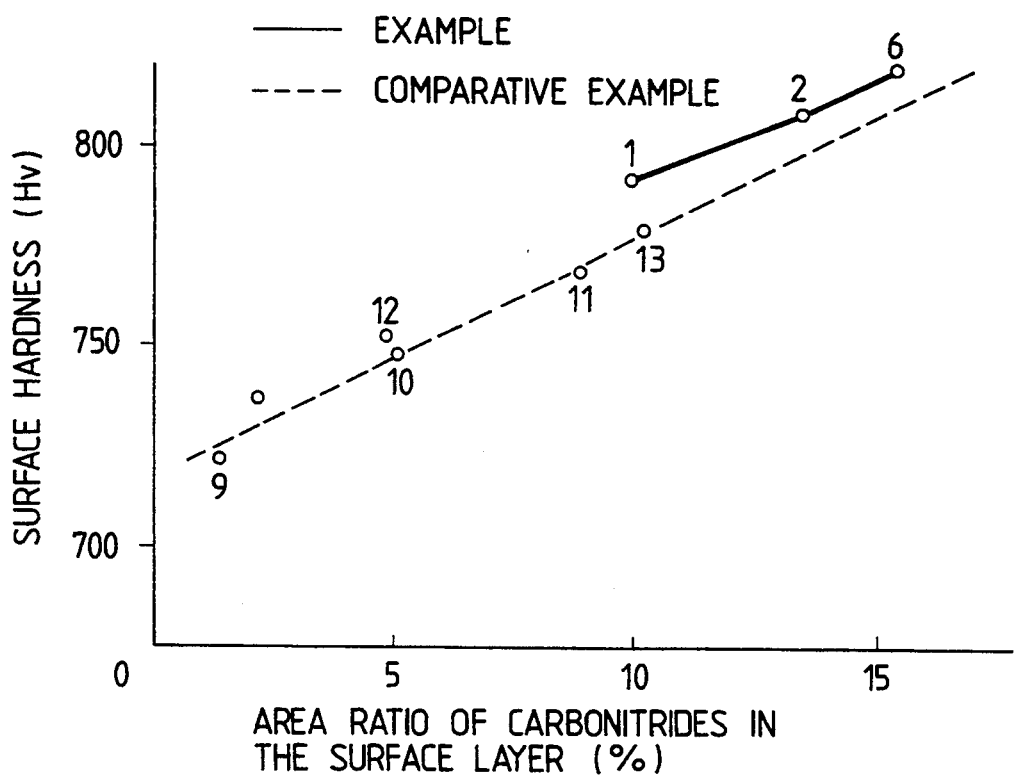
FIG. 6 is a graph showing the relationship between the area ratio (%) of carbonitrides present in the surface layer per unit area and its surface hardness (Hv) for the retained austenire level ($\gamma_R$) ranging from 30 to 35 vol %.

FIG. 6 is a graph showing the relationship between the area ratio (%) of carbonitrides present in the surface layer per unit area and its surface hardness (Hv) for the retained austenite level ($\gamma_R$ in vol %) ranging from 30 to 35 vol %. The area ratio is defined as: (the area of carbonitrides present in the surface layer/unit area)×100%, where the surface layer refers to that zone which is by a desired level, say, 0.2 mm, deep from the surface.

One can see from FIG. 6 that in order to insure that the surface hardness (Hv) is increased (to 750 Hv and more as will be discussed later) for the range of retained austenite level ($\gamma_R$ in vol %) that is optimal for extending the life of bearings, the area ratio of carbonitrides present in the surface layer per unit area must be at least 10%. If the area ratio of carbonitrides present per unit area is less than 10%, the surface hardness is below 750 Hv and unable to compensate for the drop in surface hardness for the optimal range of retained austenite levels ($\gamma_R$ in vol %).

For the reasons set forth above, the area ratio of carbonitrides present in the surface layer per unit area is specified to be 10% and more.

It should be noted here that the amount of carbonitrides can be controlled by adjustment of various parameters such as the contents of carbide forming elements and the tempering temperature.

Figure 7:
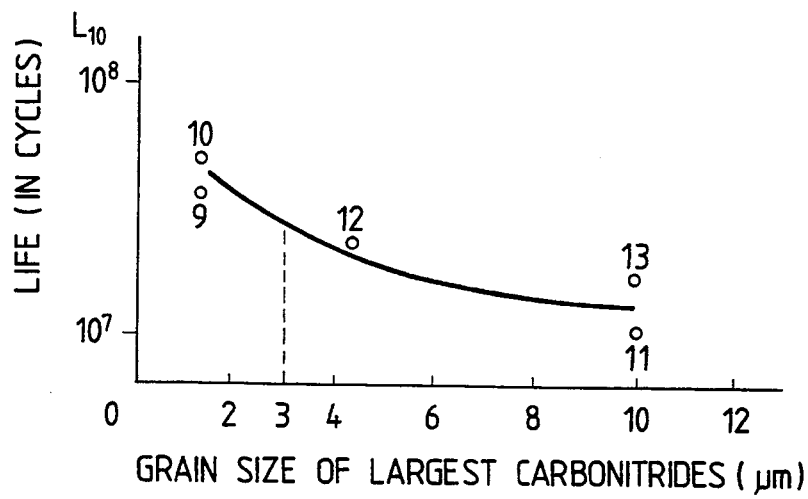
FIG. 7 is a graph showing the relationship between the grain size of largest carbonitrides (μm) and the life of beating ($L_{10}$) expressed in terms of the number of repeated stresses (in cycles) due to rolling under lubrication in clean conditions.

No more than 3 μm in terms of the grain size largest carbonitrides present in the surface layer FIG. 7 is a graph showing the relationship between the grain size of largest carbonitrides (μm) and the life of bearing ($L_{10}$) expressed in terms of the number of repeated stresses (in cycles) due to rolling under lubrication in clean conditions.

One can see from FIG. 7 that the life of bearing ($L_{10}$) becomes shorter if the grain size of carbonitrides exceeds 3 μm. This is because carbonitrides of the larger grain size become a source of stress concentration, which increases the chance of the occurrence of cracks and other defects. Thereby the rolling life of the bearing is shortened.

For these reasons, the grain size of largest carbonitrides present in the surface layer is specified to be no more than 3 μm.

25 vol %≦retained austenite ($\gamma_R$) in the surface layer≦45 vol %

Foreign materials in lubricants, etc. will cause indentations to occur in the rolling surface layer. Cracks that are prone to develop at the edges of such indentations are closely related to the level of retained austenite ($\gamma_R$ in vol %) in the surface layer. The specific nature of retained austenite varies somewhat with the carbon content of the bearing material but it is usually soft and viscous. Therefore, if the retained austenite is allowed to be present in a desired proportion in the rolling surface layer, the stress concentration at the edges of indentations can be sufficiently reduced to suppress the occurrence of cracking. The retained austenite in the rolling surface layer has another effect: if a member that passes over the indentation during rolling (e.g., the races in relation to rolling elements) makes relative passes exceeding a predetermined number, said retained austenite undergoes martensite transformation on account of the deforming energy as applied to the surface, whereby the rolling surface layer becomes hardened and the life ($L_{10}$) of the bearing under lubrication in the presence of foreign matter is extended.

Figure 8:
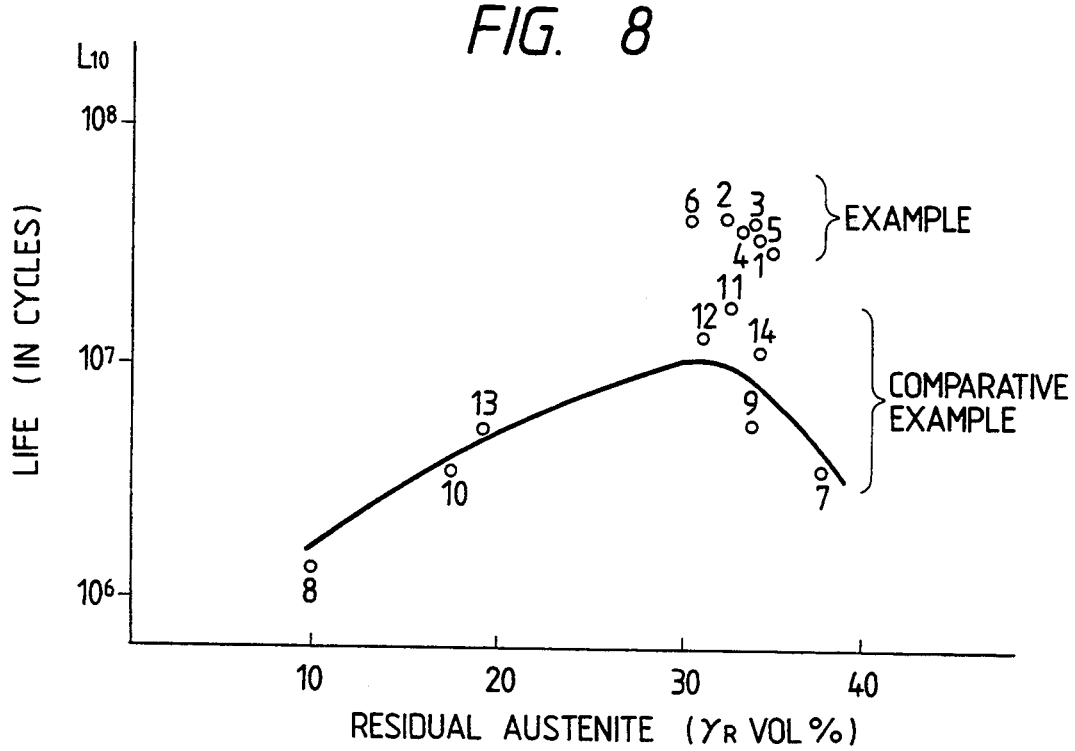
FIG. 8 is a graph showing the relationship between the retained austenite level ($\gamma_R$ in vol %) in the races and rolling elements of a ball-and-roller bearing and its life ($L_{10}$) under lubrication in the presence of foreign matter.
Figure 9:
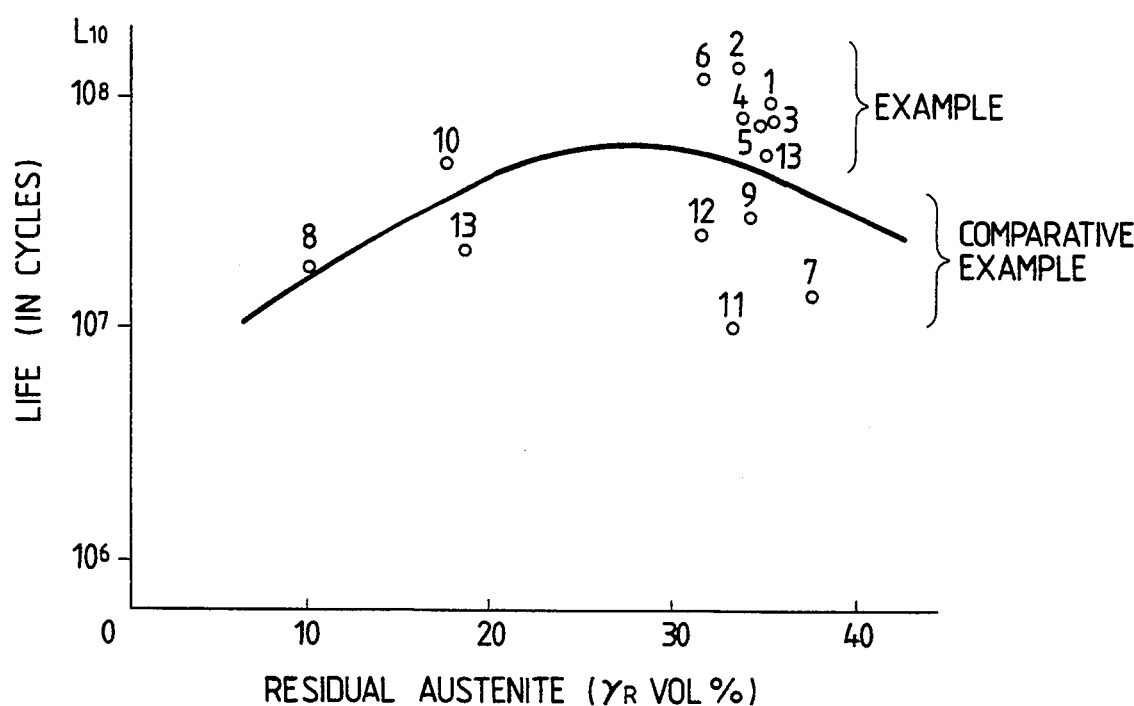
FIG. 9 is a graph showing the relationship between the retained austenite level ($\gamma_R$ in vol %) in the races and rolling elements of a ball-and-roller bearing and its life ($L_{10}$) under lubrication in clean conditions.

FIG. 8 is a graph showing the relationship between the retained austenite level ($\gamma_R$ in vol %) in the races and rolling elements of a ball-and-roller bearing and its life ($L_{10}$) under lubrication in the presence of foreign matter, and FIG. 9 is a graph showing the relationship between the retained austenite level ($\gamma_R$ in vol %) in the races and rolling elements of a ball-and-roller bearing and its life ($L_{10}$) under lubrication in clean conditions.

One can see from FIGS. 8 and 9 that the life of bearing ($L_{10}$) varies as the retained austenite level ($\gamma_R$ in vol %) varies. It can also be seen that given the same retained austenite level ($\gamma_R$ in vol %), the life of bearing ($L_{10}$) differs between lubrication in the presence of foreign matter and lubrication in clean conditions. In the light of these observations, one must find an appropriate range for the retained austenite level ($\gamma_R$ in vol %) that is necessary for insuring a long service life of bearing ($L_{10}$) under both conditions of lubrication.

If the level of retained austenite ($\gamma_R$) in the surface layer is less than 25 vol %, the above-mentioned effect of the retained austenite (i.e., reducing the stress concentration which would otherwise occur at the edges of indentation due to dust particles) cannot be fully exhibited.

If the level of retained austenite ($\gamma_R$) in the surface layer exceeds 45 vol %, its stress concentration reducing effect is saturated and the surface hardness of the bearing will decrease rather than increase, which simply results in a lowered fatigue resistance.

For these reasons, the level of retained austenite ($\gamma_R$) in the surface layer is limited to lie within the range of 25 to 45 vol %.

At least 750 Hv in terms of the surface hardness of the surface layer

Figure 10:
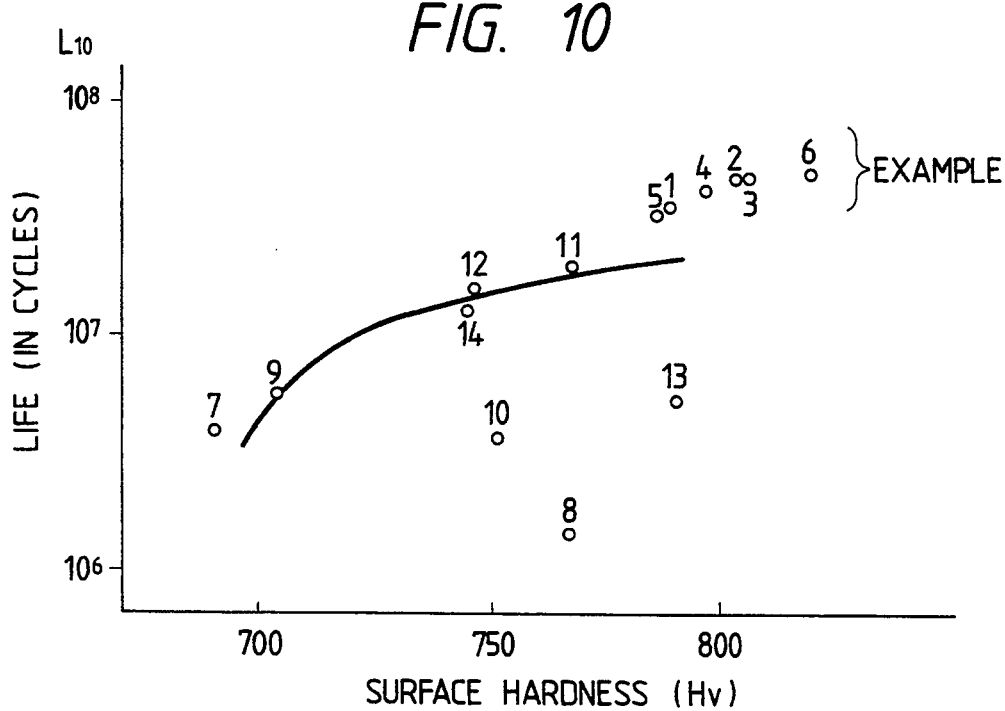
FIG. 10 is a graph showing the relationship between the surface hardness (Hv) and the life of bearing ($L_{10}$) under lubrication in the presence of foreign matter.

FIG. 10 is a graph showing the relationship between the surface hardness (Hv) and the life of bearing ($L_{10}$) under lubrication in the presence of foreign matter, and FIG. 11 is a graph showing the relationship between the surface hardness (Hv) and the life of bearing ($L_{10}$) under lubrication in clean conditions.

One can see from FIGS. 10 and 11 that irrespective of the conditions of lubrication, the life of bearing ($L_{10}$) becomes short very abruptly if the surface hardness is less than 750 Hv. This is because unless the surface hardness is at least 750 Hv and more, the fatigue resistance of the bearing is deteriorated and its life ($L_{10}$) is shortened whether lubrication is effected in the presence of foreign matter or in clean conditions.

For these reasons, the surface hardness of the surface layer of the bearing material is specified to be at least 750 Hv.

While the term "surface layer" has been used hereinabove, it means the range of a layer that extends from the surface to a certain desired depth, such as one that corresponds to 2% of the average diameter of rolling elements where a maximum shear stress will develop.

Examples of the carbides as mentioned herein include $Fe_3C$ and examples of the carbonitrides include $Fe_3(CN)_4$.

EXAMPLES

The following examples are provided for the purpose of further illustrating the present invention but are in no way to be taken as limiting.

An ordinary case-hardening steel (SCr 440), a bearing steel (SUJ 2) and S45C were used as bearing materials and they were subjected to the heat treatments described below. Table 1 shows which bearing materials (as identified by test piece No.) were subjected to which heat treatments.

Heat treatment A:

A sample was subjected to a carbonitriding treatment at 870° C. for 5 h in an Rx gas atmosphere with 0.3 to 0.7% En enriched gas and 5 to 10% $NH_3$ gas. Thereafter, the sample was left to cool at room temperature, then held at 840° C. for 30 min, followed by quenching and tempering.

Heat treatment B:

A sample was subjected to a carbonitriding treatment at 870° C. for 5 h in an Rx gas atmosphere with 0.3 to 0.7% En enriched gas and 5 to 10% $NH_3$ gas. Thereafter, the sample was left to cool at room temperature, then left to stand at 600° C. for 3 h, left to cool at room temperature, again held at 840° C. for 30 min, followed by quenching and tempering.

Heat treatment C:

A sample was subjected to a carbonitriding treatment at 840° C. for 3 h in an Rx gas atmosphere with 0.3 to 0.7% En enriched gas and 5 to 10% $NH_3$ gas. Thereafter, the sample was held at 840° C. for 30 min, followed by quenching and tempering.

Heat treatment D:

A sample was held at 840° C. for 30 min, quenched thoroughly and tempered.

Heat treatment E:

A sample was subjected to an ordinary carburizing treatment at 930° C. for 5 h, then to direct quenching, followed by tempering.

Heat treatment F:

A sample was subjected to an ordinary carburizing treatment at 930° C. for 5 h, then left to cool at room temperature, and held at 840° C. for 30 min, followed by quenching and tempering.

Heat treatment G:

A sample was subjected to a high-concentration carburizing treatment at 930° C. for 5 h, then to direct quenching, followed by tempering.

Heat treatment H:

A sample was subjected to a high-concentration carburizing treatment at 930° C. for 5 h, then left to cool at room temperature and held at 840° C. for 30 min, followed by quenching and tempering.

Heat treatment I:

A sample was subjected to a carbonitriding treatment at 870° C. for 5 h in an Rx gas atmosphere with 0.3 to 0.7% En enriched gas and 5 to 10% $NH_3$ gas. Thereafter, the sample was subjected to direct quenching and tempered.

Among the heat treatments A to I, it was in A, B and C that carbonitriding and hardening heat treatment were conducted in accordance with the present invention.

TABLE 1

| Sample No. | Bearing material | Heat treatment |
|---|---|---|
| Example 1 | ordinary case-hardening steel: SCr 440 C:0.4%, Cr: 1.05% | A |
| Example 2 | ordinary case-hardening steel: SCr 440 C: 0.4%, Cr: 1.05% | B |
| Example 3 | bearing steel: SUJ2 C: 1.0%, Cr: 1.5% | C |
| Example 4 | bearing steel: SUJ2 C: 0.4%, Mo: 1.2% | A |
| Example 5 | bearing steel: SUJ2 C: 0.4%, V: 1.0% | A |
| Example 6 | bearing steel: SUJ2 C: 0.4%, Cr: 27%, Mo: 1.0%, V: 0.5% | A |
| Comparative Example 1 | S45C C: 0.45% | A |
| Comparative Example 2 | bearing steel: SUJ2 C: 1.0%, Cr: 1.5% | D |
| Comparative Example 3 | ordinary case-hardening steel: SCr 440 C: 0.4%, Cr: 1.05% | E |
| Comparative Example 4 | ordinary case-hardening steel: SCr 440 C: 0.4%, Cr: 1.05% | F |
| Comparative Example 5 | ordinary case-hardening steel: SCr 440 C: 0.4%, Cr: 1.05% | G |
| Comparative Example 6 | ordinary case-hardening steel: SCr 440 C: 0.4%, Cr: 1.05% | G |
| Comparative Example 7 | ordinary case-hardening steel: SCr 440 C: 0.4%, Cr: 1.05% | H |
| Comparative Example 8 | ordinary case-hardening steel: SCr 440 C: 0.4%, Cr: 1.05% | I |

Each of the test pieces that were subjected to heat treatments A to I was investigated for the contents of carbon and nitrogen (wt %) in the surface layer, the area ratio (%) of carbonitrides present in the surface layer per unit area, the grain size of largest carbonitrides (μm) present in the surface layer, the retained austenite level ($\gamma_R$ in vol %) of the surface layer, the surface hardness (Hv) of the surface layer, and the life of bearing ($L_{10}$) under lubrication in the presence of foreign matter and in clean conditions. The results are shown in Table 2. FIG. 7 shows the relationship between the grain size of largest carbonitrides (μm) present in the surface layer and the life of bearing ($L_{10}$); FIG. 8 shows the relationship between the retained austenite level ($\gamma_R$ in vol %) of the surface layer and the life of bearing ($L_{10}$) under lubrication in the presence of foreign matter; FIG. 9 shows the relationship between the retained austenite level ($\gamma_R$ in vol %) of the surface layer and the life of bearing ($L_{10}$) under lubrication in clean conditions; FIG. 10 shows the relationship between the surface hardness (Hv) of the surface layer and the life of bearing ($L_{10}$) under lubrication in the presence of foreign matter; and FIG. 11 shows the relationship between the surface hardness (Hv) of the surface layer and the life of bearing ($L_{10}$) under lubrication in clean conditions. The numerals on and around the curves in FIGS. 7 to 11 are keyed to the identification numbers of the respective test pieces.

The life of bearing was evaluated by a thrust life test using a thrust testing machine of the type described in "Tokushuko Binran (Handbook of Specialty Steels)", First Edition, compiled by Denki Seiko Kenkyusho, published by Rikogakusha, May 25, 1969, pp. 10–21. The testing conditions were as follows:

Lubrication in the presence of foreign matter

Areal pressure: 4900 MPa
Number of revolutions: 3000 cpm
Lubricating oil: Turbine oil #68
Foreign matter (dust particles): 300 ppm of $Fe_3C$ particles in the lube oil
Hardness = HRC 52
Grain size = 74 to 147 $\mu$m Lubrication under clean conditions Areal pressure: 5200 MPa
Number of revolutions: 3000 cpm
Lubricating oil: Turbine oil #68

Each test piece was considered to have reached the end of its life when cracking or flaking discernible either with the naked eye or under a microscope developed. The quantitative expression of the life ($L_{10}$) is equivalent to the cumulative number of revolutions (cycles) up to the point of time when 10% of the test pieces of each sample came to the end of their life.

The test piece prepared in Comparative Example 1 contained Cr, Mo and V in an amount less than 1 wt %, so the level of carbonitrides in the surface layer decreased to shorten the life of bearing ($L_{10}$).

The test piece of Comparative Example 2 was prepared by performing an ordinary heat treatment (D) and, hence, its life of bearing ($L_{10}$) was also short.

The test piece of Comparative Example 3 was prepared by an ordinary carburization method, so its retained austenite level ($\gamma_R$) was appropriately in the range of 25 to 45 vol % but, on the other hand, the surface hardness (Hv) of the surface layer was less than 750 Hv and, hence, its life of bearing ($L_{10}$) was short.

The test piece of Comparative Example 4 had a retained austenire level ($\gamma_R$) lower than 25 vol %, so its life of bearing ($L_{10}$) was short, particularly under lubrication in the presence of foreign matter.

The test pieces of Comparative Examples 5, 6 and 7 had been subjected to high-concentration carburization, so macrocarbides was followed and their life of bearing ($L_{10}$) was short, particularly under lubrication in clean conditions.

The test piece of Comparative Example 8 and had not

TABLE 2

| | Surface layer | | | | Life of bearing | |
|---|---|---|---|---|---|---|
| Test piece No. | C + N (%) | Maximum carbonitride size ($\mu$m) | Carbonitride area ratio (%) | Surface hardness (Hv) | Retained austenite level (vol %) | Lubrication under clean condition ($L_{10}$) | Lubrication in the presence of foreign matter ($L_{10}$) |
| Example 1 | 1.4 | 1.2 | 11 | 790 | 35 | $9.8 \times 10^7$ | $35.0 \times 10^6$ |
| Example 2 | 1.4 | 1.2 | 14 | 805 | 33 | $11.0 \times 10^7$ | $43.0 \times 10^6$ |
| Example 3 | 1.5 | 2.7 | 15 | 807 | 34 | $9.6 \times 10^7$ | $42.1 \times 10^6$ |
| Example 4 | 1.4 | 0.6 | 10 | 797 | 33 | $9.0 \times 10^7$ | $40.0 \times 10^6$ |
| Example 5 | 1.4 | 0.7 | 10 | 788 | 35 | $8.5 \times 10^7$ | $34.1 \times 10^6$ |
| Example 6 | 1.4 | 1.2 | 17 | 820 | 31 | $10.8 \times 10^7$ | $45.0 \times 10^6$ |
| Comparative Example 1 | 1.2 | 0.9 | 3 | 691 | 37 | $1.3 \times 10^7$ | $5.8 \times 10^6$ |
| Comparative Example 2 | 1.0 | 1.8 | 7 | 768 | 10 | $1.4 \times 10^7$ | $1.9 \times 10^6$ |
| Comparative Example 3 | 1.0 | 1.6 | 2 | 718 | 34 | $3.7 \times 10^7$ | $7.3 \times 10^6$ |
| Comparative Example 4 | 1.0 | 1.6 | 7 | 752 | 17 | $5.7 \times 10^7$ | $5.7 \times 10^6$ |
| Comparative Example 5 | 1.4 | 10.0 | 9 | 772 | 33 | $1.0 \times 10^7$ | $20.0 \times 10^6$ |
| Comparative Example 6 | 1.2 | 4.2 | 6 | 748 | 32 | $2.0 \times 10^7$ | $12.0 \times 10^6$ |
| Comparative Example 7 | 1.4 | 10.0 | 12 | 775 | 18 | $1.6 \times 10^7$ | $7.0 \times 10^6$ |
| Comparative Example 8 | 1.2 | 1.2 | 3 | 735 | 35 | $6.0 \times 10^7$ | $11.0 \times 10^6$ |

The test pieces prepared in Examples 1 to 6 contained 0.2 to 1.0 wt % of carbon and at least 1 wt % in total of one or more elements selected from among chromium, molybdenum and vanadium and, after they were carbonitrided and subjected to a hardening heat treatment in accordance with the present invention, the area ratio (%) of carbonitrides present in the surface of each test piece per unit area was at least 10%, the grain size of largest carbonitrides ($\mu$m) present in the surface layer was no more than 3 $\mu$m, the retained austenite level ($\gamma_R$) Of the surface layer was 25 to 45 vol %, and the surface hardness of the surface layer (Hv) was at least 750 Hv. Tables 1 and 2, as well as FIGS. 7 to 11 demonstrate that those test pieces had a longer life of bearing ($L_{10}$) than the other test pieces.

The improvement in $L_{10}$ was particularly great with the test piece of Example 2 which had been subjected to heat treatment B and with the test piece of Example 6 which had the largest sum of Cr, Mo and V.

been subjected to a hardening heat treatment in accordance with the present invention, so its life of bearing ($L_{10}$) was short, particularly under lubrication in clean conditions.

In the examples described above, SCr 440 and SUJ 2 were o used as bearing materials; however, it should be understood that these are not the sole case of the present invention and that other bearing materials such as SUJ 3 and SUJ 4 may of course be employed as long as they contain 0.2 to 1.0% of carbon and at least 1 wt % in total of one or more elements selected from among chromium, molybdenum and vanadium.

As described on the foregoing pages, according to the present invention, a bearing material that contains 0.2 to 1.0 wt % of carbon and at least 1 wt % in total of one or more elements selected from among chromium, molybdenum and vanadium is subjected to a carbonitriding treatment, followed by a hardening heat treatment in accordance with the present invention to make an alloy steel in which the area ratio of carbonitrides present in the surface layer of said bearing material per unit area is adjusted to be at least 10%, a maximum grain size of carbonitrides present in said surface layer being no more than 3 μm, the content of retained austenite ($\gamma_R$) in said surface layer being 25 to 45 vol %, and said surface layer having a surface hardness of at least 750 Hv. Since at least one of the races and rolling elements of the ball-and-roller bearing of the present invention is made of this alloy steel, the contents of carbon and nitrogen that must be dissolved in order to insure optimal levels of retained austenire ($\gamma_R$) and carbonitrides can be increased without causing the precipitation of macrocarbides. Using this alloy steel, ball-and-roller bearings can be produced that have a longer life and which exhibit higher reliability than the prior art products not only under lubrication in the presence of foreign matter but also under lubrication in clean conditions.

What is claimed is:

1. A ball-and-roller bearing comprising races and rolling elements, at least one of said races and rolling elements being made of an alloy steel that contains 0.2 to 1.0 wt % of carbon and at least 1 wt % but not more than 18 wt % in total of one or more elements selected from among chromium, molybdenum and vanadium, at least one of said races and rolling elements having been subjected to carbonitriding and hardening heat treatment, such that the area ratio of carbonitrides present in the treated surface layer per unit area is in the range of 10%–17%, a maximum grain size of carbonitrides present in said surface layer being no more than 3 μm, the content of retained austenite ($\gamma_R$) in said surface layer being 25 to 45 vol %, and said surface layer having a surface hardness of at least 750 Hv.

2. A ball-and roller bearing according to claim 1, in which the chromium content is limited to lie within the range of 1.0 to 13.0 wt %.

3. A ball-and roller bearing according to claim 1, in which the molybdenum content is limited to lie within the range of 0.5 to 3.0 wt %.

4. A ball-and roller bearing according to claim 1, in which the vanadium content is limited to lie within the range of 0.2 to 1.0 wt %.

* * * * *